United States Patent Office 2,867,640
Patented Jan. 6, 1959

2,867,640

OXALATE PROCESS FOR SEPARATING ELEMENT 94

John William Gofman, San Francisco, Calif., assignor to the United States of America as represented by the United States Atomic Energy Commission No Drawing. Application June 5, 1947
Serial No. 752,831

6 Claims. (Cl. 260—429.1)

The present invention relates to the recovery and concentration of transuranic elements. More particularly it is concerned with a method for the separation of plutonium from solutions containing impurities commonly associated with that element.

It is an object of this invention to provide an efficient method for the separation of transuranic elements from uranium, fission products, and other contaminants associated therewith.

It is a further object of this invention to provide a process for the recovery of plutonium utilizing thorium oxalate as a carrier therefor under conditions such that a clean separation of plutonium having a valence state not greater than $+4$ from hexavalent uranium, is effected.

Other objects and advantages of the present invention will be apparent from the description that follows.

In co-pending application U. S. Serial No. 641,627, filed January 16, 1946, by Raymond W. Stoughton, a process is described and claimed whereby transuranic elements in a valence state not greater than 4 can be removed from solutions containing impurities commonly associated therewith by the utilization of an insoluble oxalate as a carrier for said elements. Among the insoluble oxalates set forth as suitable carriers in the process referred to are the oxalates of the alkaline earth metals and the rare earth metals, including thorium, and tetravalent uranium.

While the conditions set forth in the aforesaid description provide for the removal of plutonium from solutions of the type commonly encountered, such solutions must be substantially free from uranyl ions, owing to the relative insolubility of uranyl oxalate in said solutions, in order to effect a suitable separation of the plutonium from uranium. Moreover, with certain of the carriers mentioned above the efficiency is materially reduced when attempting to recover plutonium from solutions containing concentrations of ferric ions substantially in excess of 0.05 M.

It has now been discovered that the foregoing difficulties can be readily obviated by the utilization of thorium oxalate as a carrier for the plutonium and conducting the carrying or removal from acidified plutonium-containing solutions while avoiding the presence of a large excess of oxalate ions, preferably using a small excess of oxalate ions and conducting the carrying at room temperature while the solution is agitated. In carrying out the process of the present invention it has been generally found most desirable to employ solutions having a molar excess of oxalate ions not substantially in excess of 0.02 M and preferably from about 0.0 to 0.02 M, for example about 0.015 M. Ordinarily, with oxalate concentrations substantially in excess of 0.02 M the solubility product of uranyl oxalate is exceeded.

Inasmuch as it is known that thorium oxalate is quite soluble in neutral solutions, it is essential that the initial acidity of the plutonium containing solutions should be maintained within a range of from about 0.05 to about 4.0 N. In this connection it should be noted that with relatively high acidities correspondingly lower concentrations of excess oxalate should be employed in order to prevent substantial precipitation of uranyl ions as uranyl oxalate with the product precipitate of thorium oxalate. This precaution should be observed since the solubility of thorium oxalate increases substantially in solutions having a nitric acid concentration appreciably above 1.0 N, whereas the solubility of uranyl oxalate remains for the most part unaffected by increased acidity. Thus, in regard to the optimum acidity range, it may be said that in the majority of instances a value of around 1.0 N is generally considered most desirable.

In agreement with the above observations, there has been found to exist a definite correlation between the percent plutonium carried and the percentage of thorium in solution precipitated as thorium oxalate. For example, it has been shown that precipitation of 99 percent of the thorium in solution as oxalate, carried 98.8 percent of the plutonium present in solution, whereas in instances in which only 70 percent of the thorium oxalate precipitated just 63 percent of the plutonium was removed.

In carrying out the process of the present invention any soluble thorium compound may be employed as a source of thorium ions; however, in general, thorium nitrate is preferable since it does not introduce an anion which might be considered objectionable at any stage in the present separation process. The molar concentration of thorium ions may vary rather widely and for the most part is controlled only by the concentration of oxalate ion present. However, it will ordinarily be found that thorium ion concentrations ranging from between about 0.01 to about 0.03 M are most satisfactory. In employing thorium oxalate as a carrier in accordance with the present invention it is generally preferable to form such compound in the plutonium-containing solution by adding a source of oxalate ions such as oxalic acid, potassium oxalate, or ammonium oxalate to a solution which contains both the plutonium and thorium. Satisfactory carrying or adsorption can also be secured by adding a suitable source of thorium ions to the oxalate-containing solution, or, if desired, preformed thorium oxalate, per se, may be added and the plutonium removed thereby. In most instances, however, it has generally been found that the quantity of plutonium carried is somewhat less when thorium is added to a plutonium solution containing oxalate ions.

In this connection it should also be pointed out that plutonium in order to be carried from solution in accordance with the present invention must be present in the ionic form and in a valence state not above $+4$, for example $+3$ or $+4$. If the plutonium ions are allowed to form a stable complex, it has been found that satisfactory carrying cannot be effected in view of the relatively high solubility thereof and hence conditions which favor the formation of such complexes are to be avoided. In preventing the occurrences of these soluble plutonium complexes, care should be exercised to avoid the presence of anions of slightly ionized acids where the acidity of the plutonium-containing solution is relatively low, i. e., from a pH of between about 1.5 and 4.0. The adverse effect of such ions can be avoided, however, by increasing the acidity of the solution of a highly ionized acid such as nitric acid.

Where solutions are to be processed in which the plutonium is in a valence state greater than $+4$ or a non-carriable state, it may be readily converted to a carriable form by reduction with hydroxyl ammonium chloride or hydroxyl ammonium acetate. Reduction can also be effected by utilizing such materials as sulfur dioxide, oxalate ions and the like.

The present invention may be further illustrated by the following specific example.

Example

To aliquots of a plutonium-containing solution wherein the plutonium was in the $+4$ state and which was 0.25 M in uranyl ions, 1.0 N in nitric acid, and 0.015 M in thorium nitrate, were added varying quantities of oxalic acid. The precipitation was carried out at room temperature and the solution was agitated until about five to ten minutes after the addition of oxalic acid. The results are shown in the table below.

| Oxalic acid conc., molar | Oxalic acid conc. in excess,[1] molar | Plutonium conc. in supernatant, c./m. | Uranyl oxalate precipitation | Percent Pu carried |
|---|---|---|---|---|
| 0.015 | −0.015 | 2,623 | No uranyl oxalate ppt | 40 |
| 0.033 | 0.003 | 787 | do | 84 |
| 0.033 | 0.003 | 900 | do | 81 |
| 0.050 | 0.020 | 290 | do.[2] | 95.5 |
| 0.050 | 0.020 | 140 | do.[2] | 98.6 |
| 0.060 | 0.03 | 133 | Uranyl oxalate ppt | 98.8 |
| 0.07 | 0.04 | 148 | do | 98.4 |

[1] "Oxalic acid concentration in excess" refers to the concentration of oxalic acid in excess of the oxalic acid required to quantitatively precipitate the thorium as thorium oxalate.
[2] No uranyl oxalate precipitation but solubility was exceeded.

It will be understood that the process of this invention, using a limited amount of thorium oxalate, is applicable to precipitation on thorium oxalate alone or in combination with other suitable carriers. Furthermore, although the present invention has been described with particular reference to the concentration of plutonium and to the separation thereof from uranium, it should be understood that this invention is equally applicable to the concentration and decontamination of the transuranic element known as neptunium, wherein the latter has a valent state not greater than $+4$. All of the procedures disclosed above may be applied to dilute solutions of neptunium or to dilute solutions of mixtures of neptunium and plutonium as well as aged solutions containing only plutonium.

In general, it may be said that the use of any equivalents or modifications of procedure which would naturally occur to those skilled in the art are included in the scope of the present invention.

What is claimed is:

1. A process of separating plutonium values having a maximum valence of $+4$ from hexavalent uranium values contained together in an aqueous solution, comprising adjusting the acidity of said solution to between 0.05 and 4 N; adding thorium cations and oxalic acid anions to said solution, the quantity of said oxalic acid anions being from about 0.0 to 0.02 M in excess of the stoichiometric amount for precipitation of all of the thorium as the oxalate, whereby the oxalate precipitates and said plutonium values are preferentially carried by the precipitate formed; and separating the plutonium-containing precipitate from a uranium-containing solution.

2. The process of claim 1 wherein the acidity is adjusted to about 1 N and the oxalate excess is about 0.015 M.

3. The process of claim 1 wherein the acidity is due to nitric acid and the thorium ions are added in the form of thorium nitrate.

4. The process of claim 3 wherein the thorium nitrate is added in a quantity to yield a concentration of from 0.01 to 0.03 M.

5. The process of claim 1 wherein precipitation is carried out at room temperature and the solution is agitated during precipitation.

6. The process of claim 1 wherein the oxalic acid anions are added to the solution after the thorium cations have been incorporated.

References Cited in the file of this patent

UNITED STATES PATENTS 2,776,185    Werner et al. _____ June 1, 1957

OTHER REFERENCES

Kohlschutter et al.: Berichte der deutschen chemischen Gesellschaft, vol. 34, pp. 1472–1479 (1901).

Freundlich: Colloid and Capillary Chem., p. 220 (1922) translation by Hatfield, publ. by E. P. Dutton & Co., N. Y.

Villar: Jour. of Chem. Education, vol. 19, pp. 329–330 (1942).

Seaborg: Chem. and Eng. News, vol. 23, No. 23, pp. 2190–2193 (1945).